US009817385B2

(12) United States Patent
Shiu et al.

(10) Patent No.: US 9,817,385 B2
(45) Date of Patent: Nov. 14, 2017

(54) MACHINING ASSISTANCE METHOD AND THE APPARATUS USING THE SAME

(71) Applicant: INDUSTRIAL TECHNOLOGY RESEARCH INSTITUTE, Hsinchu (TW)

(72) Inventors: Shih-Je Shiu, Huwei Township, Yunlin County (TW); Chien-Yi Lee, Taichung (TW); Yi-Ying Lin, Taichung (TW); Po-Hsun Wu, Taichung (TW); Tsung-Yi Bai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 417 days.

(21) Appl. No.: 14/583,466

(22) Filed: Dec. 26, 2014

(65) Prior Publication Data

US 2016/0132038 A1    May 12, 2016

(30) Foreign Application Priority Data

Nov. 12, 2014    (TW) .............................. 103139196 A

(51) Int. Cl.
G06F 19/00    (2011.01)
E21B 44/04    (2006.01)
G05B 19/19    (2006.01)

(52) U.S. Cl.
CPC .............. *G05B 19/19* (2013.01); *E21B 44/04* (2013.01); *G05B 2219/32001* (2013.01);
(Continued)

(58) Field of Classification Search
CPC .............. E21B 44/04; B60L 2240/423; B60W 2710/105; B60W 2710/0672
(Continued)

(56) References Cited

U.S. PATENT DOCUMENTS 4,568,198 A    2/1986    Szabo et al.
4,916,375 A    4/1990    Kurakake et al.
(Continued)

FOREIGN PATENT DOCUMENTS

CN    102023612 A    4/2011
CN    102478810 A    5/2012
(Continued)

OTHER PUBLICATIONS

Ten Wang Cheng, "Analysis, Measurement and Improvement of the Contouring Error of CNC Machine Tools," Graduate Thesis, National Chung Cheng University, Taiwan, 1999 (6 pages).
(Continued)

*Primary Examiner* — Michael J Brown
(74) *Attorney, Agent, or Firm* — Muncy, Geissler, Olds & Lowe, P.C.

(57) ABSTRACT

A machining assistance method and an apparatus using the same are provided. The machining assistance method comprises following steps. Firstly, a circle correction path is received for driving a platform to perform a circular motion. Next, a driving torque of the server driver driving the platform is obtained. Then, whether the driving torque is changed to 0 is determined; if yes, a first position of the platform is recorded. Then, whether the driving torque is changed to a peak is determined; if yes, a second position of the platform is recorded. After that, the server driver is controlled to drive the platform according to a first position and a second position in a machining process.

12 Claims, 4 Drawing Sheets

(52) U.S. Cl.
CPC ............. *G05B 2219/36421* (2013.01); *G05B 2219/36429* (2013.01); *G06F 19/00* (2013.01)

(58) Field of Classification Search
USPC ................................. 700/170, 175, 176, 159
See application file for complete search history.

(56) References Cited

U.S. PATENT DOCUMENTS

| | | | |
|---|---|---|---|
| 5,059,881 | A | 10/1991 | Fujita et al. |
| 5,598,077 | A | 1/1997 | Matsubara et al. |
| 5,920,169 | A | 7/1999 | Hamamura et al. |
| 6,252,368 | B1 | 6/2001 | Sugie |
| 2003/0034751 | A1* | 2/2003 | Walters ............... H02P 6/21 318/445 |
| 2010/0094435 | A1* | 4/2010 | Sun ................... G05B 19/416 700/72 |
| 2013/0320908 | A1 | 12/2013 | Iwashita et al. |

FOREIGN PATENT DOCUMENTS

| | | |
|---|---|---|
| EP | 1 443 372 A2 | 8/2004 |
| JP | 2014191520 A | 10/2014 |
| TW | 200813674 A | 3/2008 |
| TW | 201420269 A | 6/2014 |

OTHER PUBLICATIONS

Chun-Wei Liu, "Precision Motion Control, Auto-tuning, and Remote Monitoring of CNC Servo Motors," Graduate Thesis, National Chiao Tung University, Taiwan, 2008 (5 pages).
Ren-Bin Xiao, "Intelligent System of improving contouring accuracy on CNC machine tools," Graduate Thesis, National Central University, Taiwan, 2004 (5 pages).
Hen-Tai Hsia, "Thesis of Department of Mechanical Engineering," Chung Yung Christian University, Jun. 2004, 97 pages.
Wen-Beng Tien, "Thesis of Department of Mechanical Engineering," National Central University, Jun. 2010, 71 pages.
Ming-Yong Lin, "Thesis of Department of Automatic Control Engineering," Feng Chia University, 2002, 3 pages.
Fu-Chuan Hsu, "Application Research for Static Spatial Error and Dynamic Circle-Following Measurement of Machine Tool," Journal of Engineering Technology and Education, vol. 6, No. 3, pp. 295-308.
Cho-Tao Lee, "Thesis of Department of Mechanical Engineering," Chung Yung Christian University, Jul. 2002, 155 pages.
Ming-Hua Li, "Thesis of Department of Mechanical Engineering," Chung Yung Christian University, Jul. 2006, 139 pages.

* cited by examiner

MACHINING ASSISTANCE METHOD AND THE APPARATUS USING THE SAME

This application claims the benefit of Taiwan application Serial No. 103139196, filed Nov. 12, 2014, the disclosure of which is incorporated by reference herein in its entirety.

TECHNICAL FIELD

The disclosure relates in general to a machining assistance method and a machining apparatus using the same, and more particularly to a machining assistance method using driving torque change and a machining apparatus using the same.

BACKGROUND

A conventional mechanical machining apparatus comprises a controller and a server driver. The controller controls the server driver to perform a machining process. However, after a period of time of use, the machining apparatus will experience mechanical wear which decreases machining precision. Therefore, machine calibration is normally performed before the machining process to assure that the precision of the processed workpiece is conformed to the requirement of precision after the machining process. In a conventional calibration method, a mechanical calibration module is added to the machining apparatus. However, the added mechanical module requires extra time for assembly and calibration, making the calibration procedure even more inefficient.

SUMMARY

According to one embodiment, a machining assistance method is provided. The machining assistance method comprises following steps. Firstly, a circle correction path is received for driving a platform to perform a circular motion. Next, a driving torque of a server driver driving the platform is obtained. Then, whether the driving torque is changed to 0 is determined; if yes, a first position of the platform is recorded. Then, whether the driving torque is changed to a peak is determined; if yes, a second position of the platform is recorded. After that, the server driver is controlled to drive the platform according to a first position and a second position in a machining process.

According to another embodiment of the present disclosure, a machining apparatus is provided. The machining apparatus comprises a platform, a circular measurement module, a server driver, a commutating tip measurement module and a compensation module. The circular measurement module receives a circle correction path. The server driver drives the platform to perform a motion. The commutating tip measurement module obtains a driving torque of the server driver driving the platform to perform motion, determines whether the driving torque is changed to 0 and determines whether the driving torque is changed to a peak. If the driving torque is changed to 0, the compensation module records a first position of the platform. If the driving torque is changed to the peak, the compensation module records a second position of the platform. The controller controls the server driver to drive the platform to perform a circular motion according to the circle correction path, and controls the server driver to drive the platform according to the first position and the second position.

According to one embodiment, a machining assistance method used in a platform comprising a server driver is provided. The machining assistance method comprises following steps. Firstly, a circle correction path is received for driving the platform to perform a motion. Next, a driving torque of the server driver driving the platform is obtained to perform a motion. Then, whether the driving torque is changed to 0 is determined; if yes, a first position of the platform is recorded. Then, whether the driving torque is changed to a peak is determined; if yes, a second position of the platform is recorded. After that, at least a displacement compensation according to the first position and the second position is created.

According to another embodiment of the present disclosure, a machining apparatus used in a platform comprising a server driver is provided. The machining apparatus comprises a circular measurement module, a server driver, a commutating tip measurement module and a compensation module. The circular measurement module is for receives a circle correction path. The server driver is for driving the workpiece platform to perform a motion. The commutating tip measurement module is for obtaining a driving torque of the server driver driving the platform to perform a motion, determining whether the driving torque is changed to 0, and determining whether the driving torque is changed to a peak. The compensation module is for recording a first position of the platform if the driving torque is changed to 0, recording a second position of the platform if the driving torque is changed to the peak, and providing the first position and the second position to create at least a displacement compensation.

The above and other aspects of the disclosure will become better understood with regard to the following detailed description of the preferred but non-limiting embodiment(s). The following description is made with reference to the accompanying drawings.

Figure 1:
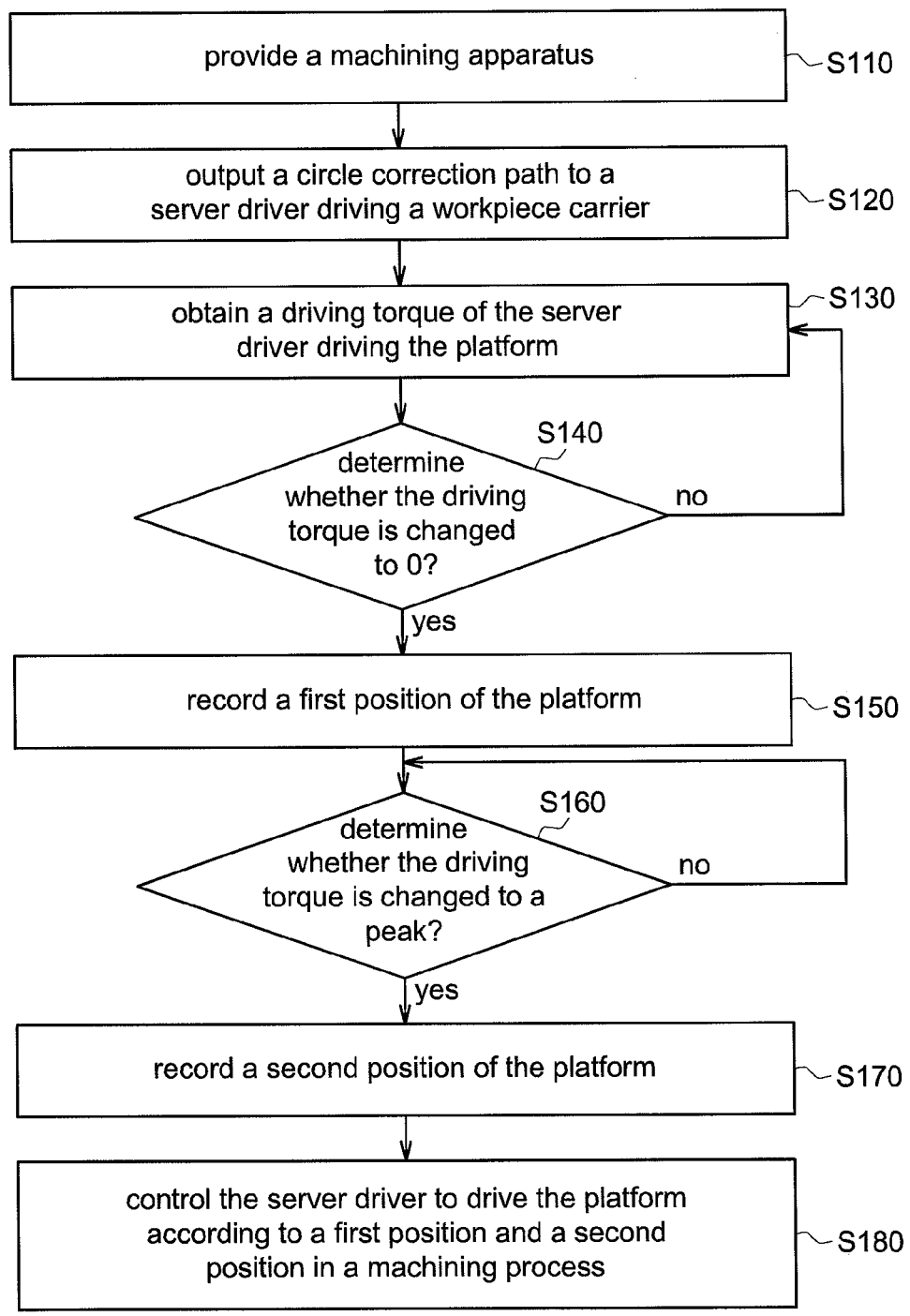
FIG. 1 shows a flowchart of a machining assistance method of a machining apparatus according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
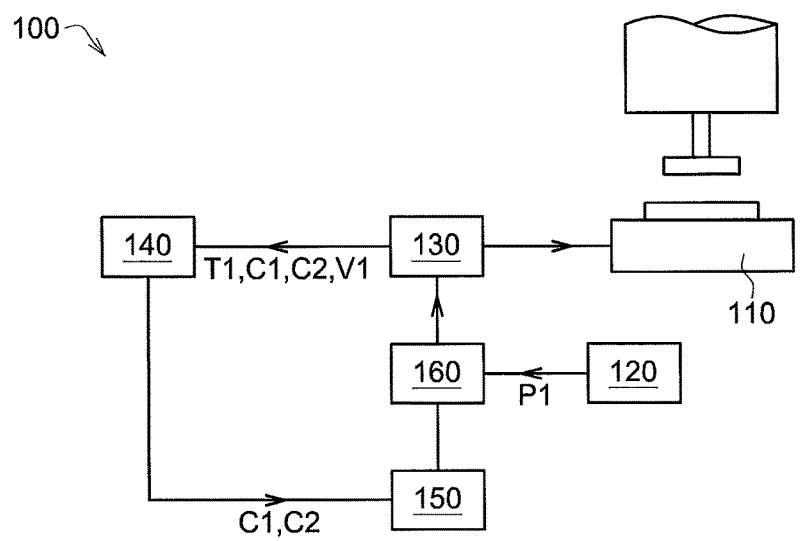
FIG. 2 shows a functional block diagram of a machining apparatus in a calibration procedure according to an embodiment of the present disclosure.

Referring to FIGS. 1 and 2, FIG. 1 is a flowchart of a machining assistance method of a machining apparatus according to an embodiment of the present disclosure. FIG. 2 is a functional block diagram of a machining apparatus in a calibration procedure according to an embodiment of the present disclosure.

In step S110, a machining apparatus 100 as shown in FIG. 2 is provided. The machining apparatus 100 comprises a platform 110, a circular measurement module 120, a server driver 130, a commutating tip measurement module 140, a compensation module 150 and a controller 160. In an embodiment, the machining apparatus 100 may be realized by such as a computer numerical control (CNC) processing machine, a milling machine or a machine tool allowing a platform and a cutting tool to perform a relative curve motion.

Figure 3:
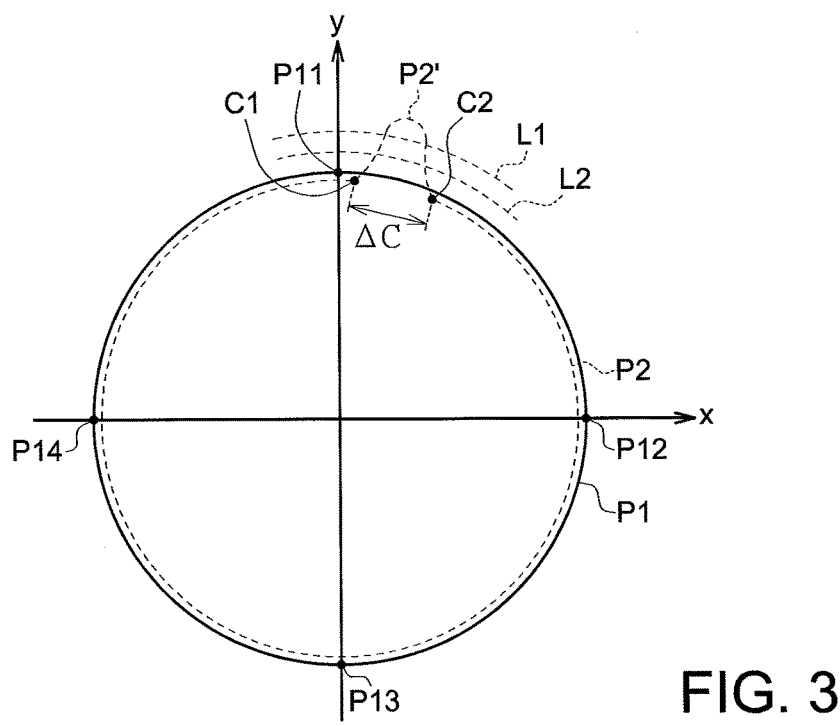
FIG. 3 shows a functional block diagram of a circle correction path according to an embodiment of the present disclosure.

Step S120 is performed with reference to FIG. 3, a functional block diagram of a circle correction path according to an embodiment of the present disclosure. In step S120, the circular measurement module 120 outputs a circle correction path P1 to a controller 160, which accordingly controls the server driver 130 to drive the platform 110 to perform a circular motion. In an embodiment, the circular measurement module 120 may provide a human-machine interface (not illustrated) through which the user may input the radius of the circle correction path P1 or other relevant parameters, and the circular measurement module 120 may receive the input form the user. In addition, the server driver 130 may be realized by such as a servo motor.

As shown in FIG. 3, the circle correction path P1 has 4 commutating points P11, P12, P13 and P14. During the process of driving the platform 110 according to the circle correction path by the server driver 130, the platform 110 will pass through these commutating points. As the platform 110 passes through the commutating point, the driving torque T1 and the driving speed V1 of the server driver 130 driving the platform 110 will change. The machining assistance method of the present embodiment of the disclosure creates a compensation model 0 according to the change in the driving torque T1 and the driving speed V1, and details of the compensation model are elaborated below.

Figure 4:
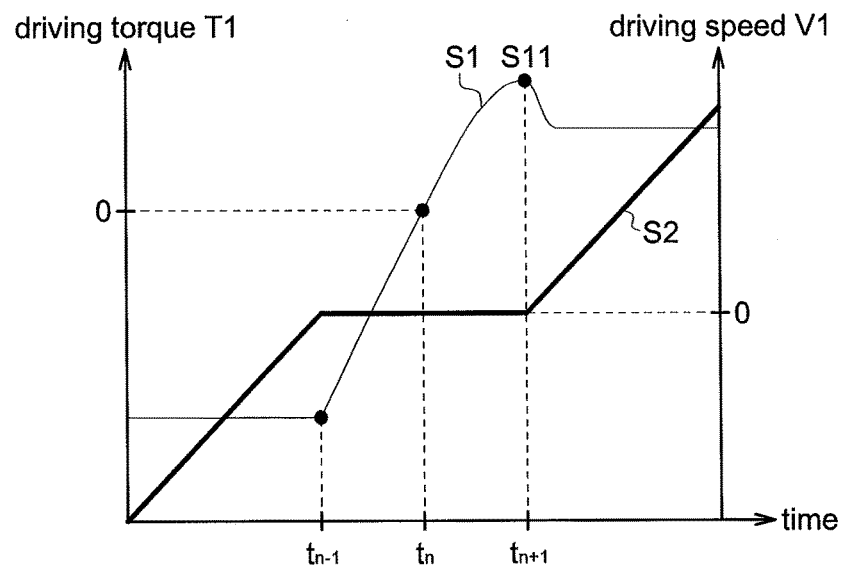
FIG. 4 shows a diagram illustrating the relationship between the driving torque and the driving speed of the server driver of FIG. 2 driving a platform according to the circle correction path P1 of FIG. 3.

Referring to FIGS. 3 and 4, FIG. 4 is a diagram illustrating the relationship between the driving torque and the driving speed of the server driver of FIG. 2 driving a platform according to the circle correction path P1 of FIG. 3. In FIG. 4, the curve S1 represents the change in the driving torque T1 of the server driver 130 (such as one of the drive screws, for example, a drive screw in the y-direction) driving the platform 110 to perform a motion; the curve S2 represent the change in the driving speed of the server driver 13 (such as one of the drive screws, for example, a drive screw in the y-direction) driving the platform 110 to perform a motion.

In the example of the server driver 130 driving the platform 110 to pass through the commutating point P11 (as shown in FIG. 3), before the platform 110 passes through the commutating point P11, for example, when the platform 110 is at time point $t_{n-1}$ (as shown in FIG. 4), the controller 160 controls the server driver 130 to decelerate and prepare for commutation. When the platform 110 reaches time point $t_n$ (as shown in FIG. 4), the controller 160 controls the server driver 130 to decelerate to 0. In the interval between time points $t_{n-1}$ and $t_n$, the driving torque T1 of the server driver 130 is gradually changed to 0 and the server driver 130 prepares for commutation. In subsequent steps, when the driving torque T1 is changed to 0, the machining apparatus 100 may record a position of the platform 110 and further use the position as a reference for compensation during an actual machining process. Details of compensation are disclosed below.

In step S130, the commutating tip measurement module 140 obtains the driving torque T1 of the server driver 130 driving the platform 110.

In step S140, the commutating tip measurement module 140 determines whether the driving torque T1 is changed to 0; if yes, the method proceeds to step S150; otherwise, the method returns to step S130, the commutating tip measurement module 140 continues to obtain the driving torque T1 of the server driver 130 driving the platform 110 and determine whether the driving torque T1 is changed to 0.

In step S150, when the driving torque T1 is changed to 0, the compensation module 150 records a first position C1 of the platform 110.

In step S160, the commutating tip measurement module 140 determines whether the driving torque T1 is changed to a peak S11 (as shown in FIG. 4); if yes, this indicates that the platform 110 has completed commutation, so the method proceeds to step S170; otherwise, the method returns to step S160, the commutating tip measurement module 140 continues to determine whether the driving torque T1 is changed to the peak S11.

As shown in FIG. 4, in order to perform commutation in the interval between time points $t_n$ and $t_{n+1}$, the server driver 130 has to boost the driving torque T1 to overcome static friction. This is because the speed of the server driver 130 is still 0 in the interval between time points $t_n$ and $t_{n+1}$, and static friction must be overcome so that a motion whose speed is higher than 0 may be generated to complete commutation. At the time point $t_{n+1}$, the server driver 130, having overcome static friction, may control the platform 110 to start commutation.

In addition, when the platform 110 passes through the commutating point, the driving torque T1 and the driving speed V1 of the server driver 130 driving the platform 110 will change. Let the commutating point P11 be taken for example. When the server driver 130 drives the platform 110 to pass through the commutating point P11, the driving speed V1 of the server driver 130 driving the platform 110 will be changed to 0 in the y-direction. To compensate such speed decrease, the controller 160 will perform a displacement compensation, which increases the displacement compensation of the platform 110 in the y-direction (this is why the peak P2' as shown in FIG. 3 occurs) and causes the peak P2' on the actual motion path P2 to exceed the tolerance upper limit L1 of roundness.

In step S170, after the server driver 130 controls the platform 110 to complete commutation, the compensation module 150 records a second position C2 of the platform 110. The distance ΔC between the first position C1 and the second position C2 reflects the characteristics and mechanical wear of the machining apparatus 100. The machining assistance method of the present disclosure reduces the peak P2' to be lower than the tolerance upper limit L1 of roundness according to the first position C1 and the second position C2 recorded in foregoing steps. Detailed descriptions of compensation are disclosed below.

Figure 5:
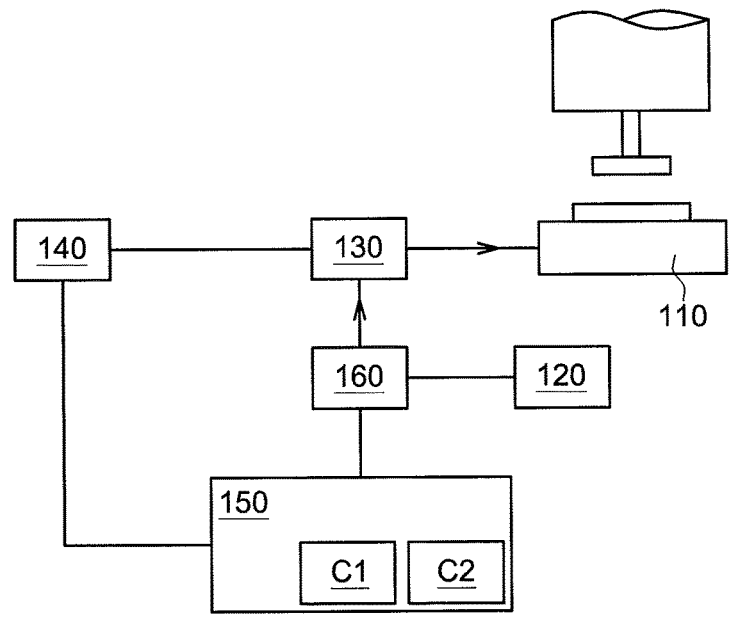
FIG. 5 shows a functional block diagram of the machining apparatus of FIG. 2 in a machining process.

Step S180 is made with reference to FIG. 5, a functional block diagram of the machining apparatus of FIG. 2 in a machining process. In step S180, during the actual machining process, the controller 160 controls the server driver 130 to drive the platform 110 according to the first position C1 and the second position C2 recorded in the compensation module 150. For example, as the distance ΔC between the first position C1 and the second position C2 increases, the driving torque T1 of the server driver 130 driving the platform 110 also increases so that the commutating deviation of the platform 110 may be reduced. Or, as the distance ΔC of the first position C1 and the second position C2 increases, the motion speed of the server driver 130 driving the platform 110 decelerates, so that the commutating deviation of the platform 110 may be reduced.

Figure 6:
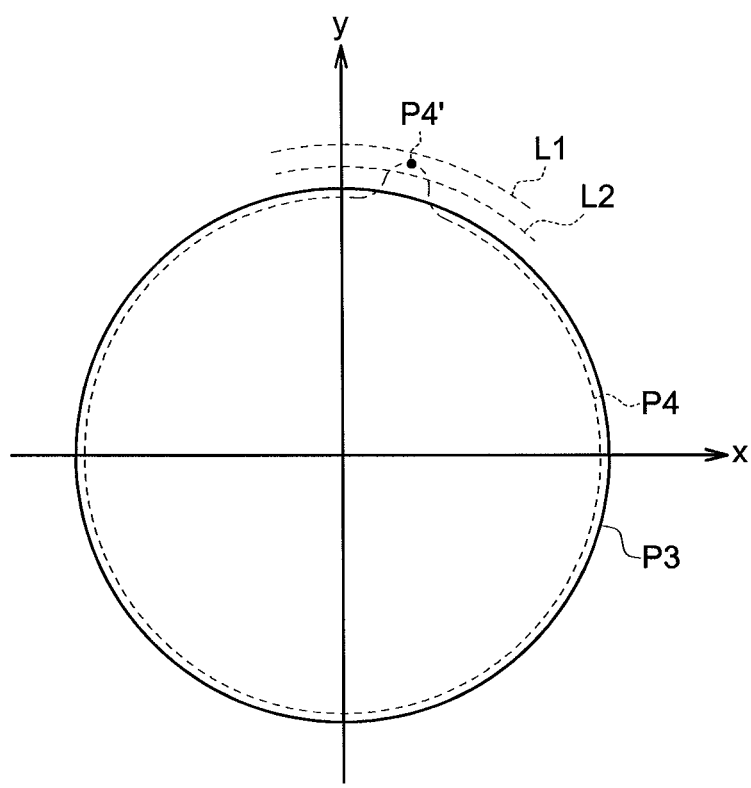
FIG. 6 shows a schematic diagram of the machining apparatus of FIG. 5 performing compensation according to a first position and a second position.

Referring to FIG. 6, a schematic diagram of the machining apparatus of FIG. 5 performing compensation according to a first position and a second position is shown. Let the server driver 130 driving the platform 110 to perform a circular path P3 be taken for example. The server driver 130 drives the platform 110 to perform the circular path P3, wherein the radius of the circular path P3 may be the same as that of the circle correction path P1. Since the controller 160 controls the server driver 130 to drive the platform 110 according to the first position C1 and the second position C2 recorded in the compensation module 150, the actual peak P4' of the motion path P4 of the platform 110 falls between the tolerance upper limit L1 and the tolerance lower limit L2 of the roundness. Also, in the embodiment of the present disclosure, the compensation timing is not limited to an arced or a circular machining path, and may also be used in such as a reciprocal or a rectangular machining path. Any machining path on which the speed of the drive screw on one axis of the server driver 160 needs to be changed to 0 first and then is further accelerated to complete commutation is a machining path to be compensated in the present embodiment of the disclosure.

In addition, during the machining process, the controller 160 may also control the server driver 130 to drive the platform 110 according to the curvature radius of the processing workpiece (not illustrated). For example, as the curvature radius of the workpiece decreases, the driving torque T1 of the server driver 130 driving the platform 110 increases; as the curvature radius of the workpiece increases, the driving torque T1 of the server driver 130 driving the platform 110 decreases. Or, as the curvature radius of the workpiece decreases, the motion speed of the server driver 130 driving the platform 110 decreases; as the curvature radius of the workpiece increases, the motion speed of the server driver 130 driving the platform 110 increases.

In the machining assistance method of the present embodiment of the disclosure, the calibration procedure (step S110-S170) is completed before the machining process (step S180) is performed. In another embodiment, the calibration procedure may be completed in the machining process. Furthermore, during an actual machining process, if necessary (for example, when it is suspected that the machining precision may be unsatisfactory), the machining process may be suspended and steps S110-S170 are performed. After steps S110-S170 are completed, the machining process is resumed, and machining compensation is performed according to the latest compensation information (such as the latest first position C1 and the latest second position C2). Or, steps S110-S170 may be performed without suspending the machining process, and after steps S110-S170 are completed, machining compensation is performed according to the latest compensation information.

At least two of the circular measurement module 120, the commutating tip measurement module 140 and the compensation module 150 may be realized by firmware, software programs or integrated circuits. In an embodiment, at least two of the circular measurement module 120, the commutating tip measurement module 140 and the compensation module 150 may be integrated in the controller 160; or, the controller 160 may be independent of the circular measurement module 120, the commutating tip measurement module 140 and the compensation module 150. In an embodiment, given that the design of the controller 160 remains unchanged, the calibration procedure may be performed as long as the circular measurement module 120, the commutating tip measurement module 140 and the compensation module 150 are added to the machining apparatus 100. In addition, by using the circular measurement module 120, the commutating tip measurement module 140 and the compensation module 150, the calibration procedure does not need to employ any extra mechanical calibration modules, such that calibration man-hours may be reduced, calibration efficiency may be increased, and/or the cost of mechanical calibration module may be saved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A machining assistance method, comprising:
    receiving a circle correction path for driving a platform to perform a circular motion by a machining apparatus;
    obtaining a driving torque of a server driver driving the platform by the machining apparatus;
    determining whether the driving torque is changed to 0 by the machining apparatus;
    recording a first position of the platform if the driving torque is changed to 0 by the machining apparatus;
    determining whether the driving torque is changed to a peak by the machining apparatus;
    recording a second position of the platform if the driving torque is changed to a peak by the machining apparatus; and
    in a machining process, controlling the server driver to drive the platform according to the first position and the second position by the machining apparatus;
    wherein in the machining process, the server driver is controlled to drive the platform according to a curvature radius of a processing workpiece.

2. The machining assistance method according to claim 1, wherein in the machining process, as the distance between the first position and the second position increases, the driving torque of the server driver driving the platform decreases.

3. The machining assistance method according to claim 1, wherein in the machining process, as the distance between the first position and the second position increases, a driving speed of the server driver driving the platform decreases.

4. The machining assistance method according to claim 1, wherein in the machining process, as the curvature radius decreases, the driving torque of the server driver driving the platform increases.

5. The machining assistance method according to claim 1, wherein the in the machining process, as the curvature radius decreases, the driving speed of the server driver driving the platform decreases.

6. A machining apparatus, comprising:
    a platform;
    a circular measurement module for receiving a circle correction path;
    a server driver for driving the platform to perform a motion;
    a commutating tip measurement module for obtaining a driving torque of the server driver driving the platform, determining whether the driving torque is changed to 0, and determining whether the driving torque is changed to a peak;

a compensation module for recording a first position of the platform if the driving torque is changed to 0, and recording a second position of the platform if the driving torque is changed to the peak; and a controller for controlling the server driver to drive the platform to perform a circular motion according to the circle correction path, and controlling the server driver to drive the platform according to the first position and the second position;

wherein the controller further:

controls the server driver to drive the platform according to a curvature radius of a processing workpiece.

7. The machining apparatus according to claim 6, wherein the server driver further:

drives the platform at a larger driving torque as the distance between the first position and the second position increases.

8. The machining apparatus according to claim 6, wherein the server driver further:

drives the platform at a lower driving speed as the distance between the first position and the second position increases.

9. The machining apparatus according to claim 6, wherein the server driver further:

drives the platform at a larger driving torque as the curvature radius decreases.

10. The machining apparatus according to claim 6, wherein the server driver further:

drives the platform at a lower driving speed as the curvature radius decreases.

11. A machining assistance method used in a platform comprising a server driver, wherein the method comprises:

receiving a circle correction path for driving the platform to perform a motion by the machining apparatus;

obtaining a driving torque of the server driver driving the platform to perform a motion by the machining apparatus;

determining whether the driving torque is changed to 0; if yes, recording a first position of the platform by the machining apparatus;

determining whether the driving torque is changed to a peak: if yes, recording a second position of the platform by the machining apparatus; and creating at least a displacement compensation according to the first position and the second position by the machining apparatus.

12. A machining apparatus used in a platform comprising a server driver, wherein the machining apparatus comprises:

a circular measurement module for receiving a circle correction path;

a server driver for driving the platform to perform a motion;

a commutating tip measurement module for obtaining a driving torque of the server driver driving the platform to perform a motion, determining whether the driving torque is changed to 0, and determining whether the driving torque is changed to a peak; and a compensation module for recording a first position of the platform if the driving torque is changed to 0, recording a second position of the platform if the driving torque is changed to the peak, and providing the first position and the second position to create at least a displacement compensation.

* * * * *